(12) United States Patent
Char et al.

(10) Patent No.: US 9,086,529 B2
(45) Date of Patent: Jul. 21, 2015

(54) OPTICAL FILM WITH PARTIALLY COATED STRUCTURE ARRAY AND MANUFACTURING METHOD THEREOF

(75) Inventors: Kookheon Char, Seoul (KR); Hyunsik Yoon, Seoul (KR); Hong Hie Lee, Seoul (KR); Kahp-Yang Suh, Seoul (KR); Eun-Kyeong Bae, legal representative, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 0 days.

(21) Appl. No.: 13/979,874

(22) PCT Filed: Jan. 17, 2012

(86) PCT No.: PCT/KR2012/000387
§ 371 (c)(1),
(2), (4) Date: Sep. 13, 2013

(87) PCT Pub. No.: WO2012/099373
PCT Pub. Date: Jul. 26, 2012

(65) Prior Publication Data
US 2014/0016207 A1 Jan. 16, 2014

(30) Foreign Application Priority Data

Jan. 17, 2011 (KR) .................. 10-2011-0004416
Jun. 30, 2011 (KR) .................. 10-2011-0064834
Nov. 30, 2011 (KR) .................. 10-2011-0126405

(51) Int. Cl.
*G02B 27/10* (2006.01)
*G02F 1/03* (2006.01)
(Continued)

(52) U.S. Cl.
CPC .............. *G02B 5/045* (2013.01); *G02B 5/1828* (2013.01); *G02B 27/2242* (2013.01)

(58) Field of Classification Search
CPC ....... B82Y 20/00; G02F 1/1393; G02F 1/167; G02F 1/155; G03G 13/22; G03G 17/04; G02B 5/045; G02B 27/145; G02B 3/0056; G02B 26/0841; G03B 21/625; G03B 21/602; G03B 21/56
USPC ......... 359/625, 618–621, 454–456, 443, 245, 359/253–254, 265, 290–291, 296, 626; 264/1.1, 1.32, 2.7; 349/33; 345/107; 430/31–32
See application file for complete search history.

(56) References Cited

U.S. PATENT DOCUMENTS 6,072,628 A   6/2000 Sarayeddine
6,277,471 B1 * 8/2001 Tang .............................. 428/172
(Continued)

OTHER PUBLICATIONS

International Search Report, published as WO 2012/099373 A3, Jul. 26, 2012.

*Primary Examiner* — Dawayne A Pinkney
(74) *Attorney, Agent, or Firm* — Renner, Kenner, Greive, Bobak, Taylor & Weber Co. LPA

(57) ABSTRACT

The present invention relates to an optical film comprising a substrate on which an array of structures is formed, wherein a material having a different refractive index, absorbancy or reflectivity from that of a surface of the structures is partially coated on the surface of the structures, and a manufacturing method thereof. Specifically, the optical film according to one embodiment of the present invention may have a different transparency depending on the direction or can transmit light asymmetrically. Further, the optical film may be applicable to image devices, which need to change brightness or images depending on the angle of view or to display three-dimensional images.

13 Claims, 21 Drawing Sheets
(16 of 21 Drawing Sheet(s) Filed in Color)

(51) Int. Cl.
  *G02F 1/133* (2006.01)
  *G09G 3/34* (2006.01)
  *G03G 13/00* (2006.01)
  *G02B 5/04* (2006.01)
  *G02B 5/18* (2006.01)
  *G02B 27/22* (2006.01)

(56) References Cited

U.S. PATENT DOCUMENTS

| | | |
|---|---|---|
| 7,139,042 B2 | 11/2006 | Nam et al. |
| 2004/0070803 A1* | 4/2004 | Decker et al. ............... 359/15 |
| 2007/0008456 A1* | 1/2007 | Lesage et al. ............... 349/62 |
| 2007/0217008 A1 | 9/2007 | Wang et al. |

* cited by examiner

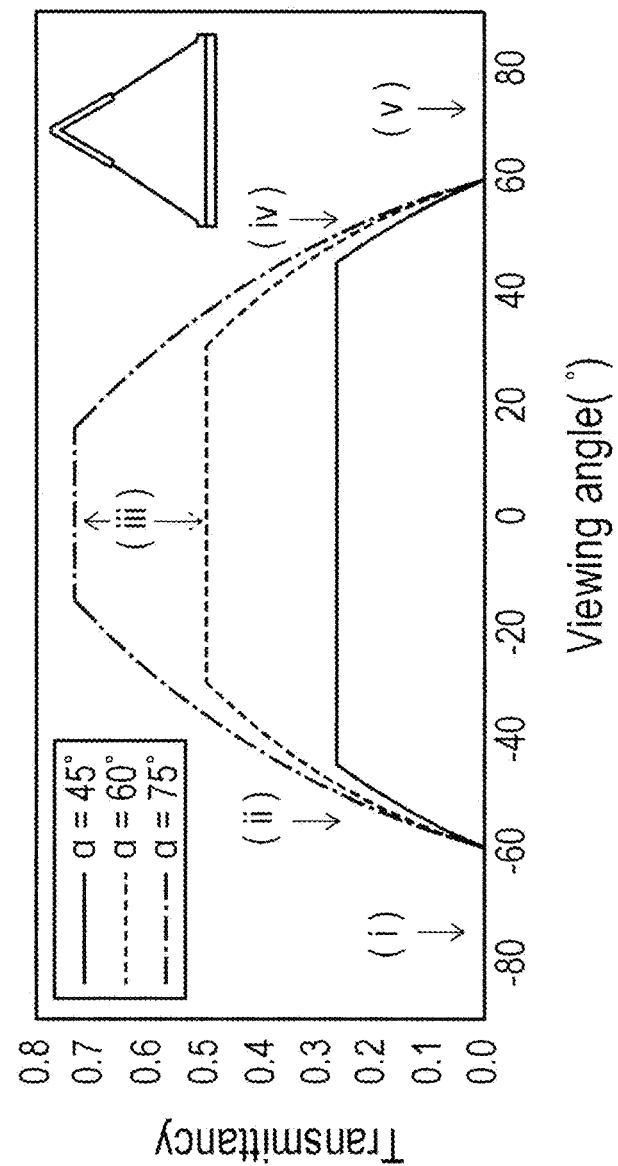

10 µm

10 μm

10 μm

20 μm

OPTICAL FILM WITH PARTIALLY COATED STRUCTURE ARRAY AND MANUFACTURING METHOD THEREOF

TECHNICAL FIELD

The present invention relates to an optical film with an array of structures on which a material having different a refractive index, absorbancy or reflectivity from that of a surface of the structures is partially coated, and manufacturing method thereof. Specifically, the optical film according to one embodiment of the present invention may change transparency depending on the direction, or reflect, absorb or transmit light asymmetrically. The optical film may be applicable to image devices, which need to change brightness or images depending on the angle of view or to display three-dimensional images.

BACKGROUND

Light display devices such as liquid crystal display (LCD) devices generally control the direction of light using optical films with a prism array to enhance brightness. Such light guides are combined to the output side of light source devices such as a cold cathode fluorescent lamp (CCFL) or light emitting diode (LED), and then to the cells of the display devices.

Enhancement of brightness can be achieved by an optical film with such a prism array, preferably by reflection and refraction processes including light regeneration. When used together with a light source device, a film having a prism-structured surface collects light, which is emitted at high angles from the output side of the light source device, in a vertical direction and directs light to viewers.

Examples of representative Brightness Enhancement Films (BEF) are those that are available from 3M Company located in Saint Paul, Minn., U.S., which typically comprise a prism array larger than a wavelength of light on one surface thereof. Such a structure is helpful in increasing the amount of light directed toward the viewers. These films are used in combination with light source devices, and thus, typically sacrifice the one- or second-dimensional reserved lighting to increase the axial lighting. By doing so, these films decrease the consumption of electricity and help achieve the desired amount of axial lighting.

Further, there already exist privacy films that are also available from 3M Company, etc., which function to allow only the front angle to be viewed and block both sides from being spied. These films are made by inserting dyes in the longitudinal direction of prisms to prevent both side angle views from being spied.

The optical films with a conventional prism array such as BEFs and privacy films guarantee brightness for the front angle view and have a symmetric property for both sides, but not for the front. Thus, it may be inappropriate to use the existing optical films in light source devices having different brightness depending on the direction (hereinafter, "directional light source devices"), displays having different brightness depending on the angle of view, three-dimensional displays, or holograms showing different images depending on the angle of view, etc.

For users to see three-dimensional images that are recently popular, special glasses are generally used to allow both eyes to see different images from each other. Recently, studies on glass-free three-dimensional displays, which require no special glasses, have been actively conducted. One representative technology is a lenticular or parallax barrier autostereoscopic technology. However, such technologies have shortcomings since the film manufacture is complicated and the left and right eye images are periodically changed depending on the direction, thereby causing nausea to the users depending on the angle of view. A recently developed method, which combines prisms and lenses, also has problems with commercialization due to complicated processes.

SUMMARY

The present invention seeks to solve the disadvantages of prior art listed above and to provide an optical film that is applicable to a new field and a manufacturing method thereof.

The optical film according to one embodiment of the present invention comprises a substrate on which an array of structures is formed and can be obtained by partially coating a material (hereinafter, "coating material") having different refractive index, absorbancy or reflectivity from that of a surface of the structures on the surface of the structures.

Depending on the use, the coating material according to one embodiment of the present invention can be coated on one side, partially coated on a desired portion of one side, or partially coated on a desired portion of both sides of the structures formed on the substrate.

The optical film according to one embodiment of the present invention can collect light in a desired direction depending on the direction. This property can be favorably used, e.g., when manufacturing displays or directional light source devices having different brightness depending on the angle of view.

Further, by coating a coating material on the structures formed on the substrate according to one embodiment of the present invention, the direction of coating can be changed periodically or non-periodically. This property can be favorably used e.g., when manufacturing three-dimensional displays or holograms.

The optical film manufactured according to the method according to one embodiment of the present invention may have different light transmittancy depending on the direction. Especially, unlike the conventional optical films that have a symmetric property in the side direction, one embodiment of the present invention may provide an optical film that changes a light transmission rate in the side direction, and thus has a symmetric or asymmetric property depending on the angle of view.

Further, by changing the direction of coating periodically or non-periodically, one embodiment of the present invention can display three-dimensional images, i.e., can allow both eyes to see different images from each other. A method applied to the existing three-dimensional displays changes images periodically so that the eyes of a human can recognize virtual images (including a reverse depth perception) or dark regions. However, the method according to one embodiment of the present invention does not periodically change images but rather be shown three-dimensional images as two-dimensional images at certain positions, thereby requiring no synchronization according to the backlight time.

A method of manufacturing the optical film according to one embodiment of the present invention is simple and easily applicable since the conventional prism array optical films can be used. Further, displays with the optical film according to one embodiment of the present invention are free from the problem of nausea caused depending on the angle of view. Accordingly, it is possible to manufacture displays having different brightness or images depending on the angle of view when the optical film according to one embodiment of the present invention is used in combination with light source devices of the displays.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
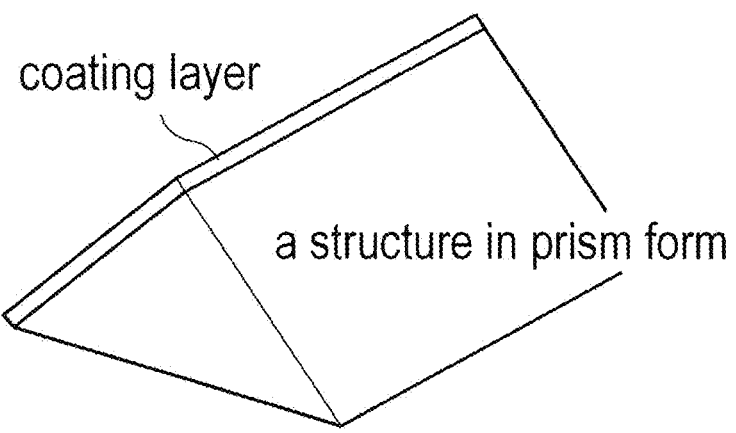
FIG. 1 shows schematic diagrams of a method of manufacturing the optical film according to one embodiment of the present invention.

A substrate for use in the manufacture of the optical film according to one embodiment of the present invention can be any transparent substrates used in the field of display. The examples of the substrates may include, but not limited to, glass, plastic, metal, nanocomposite, etc. Glass or plastic is preferred.

Transparent structures for use in the manufacture of the optical film according to one embodiment of the present invention may be in circular or polygonal form, etc. The examples of the structure forms may include, but not limited to, a prism form, a semicircular form, a square form, a pyramid form, etc. Prism form is preferred.

A material for use in the formation of transparent structures of the optical film according to one embodiment of the present invention may be any transparent or translucent materials, which can form structures by molding and then curing using light or heat. The examples of transparent or translucent materials may include, but not limited to, polymers, glass compositions, nanocomposites, etc. Polymers are preferred. Particularly, acrylate-based polymers and siloxane-based polymers are preferred.

A coating material for use in one embodiment of the present invention may be any materials, which have a different refractive index from that of the materials used in the formation of the structures. The coating material may be a material that refracts, absorbs or reflects light. The examples of the coating materials include metals, inorganics, organics, etc. Metals and inorganics are preferred. Metals are especially preferred. The examples of the metals used include, but not limited to, metals, which have been previously used in the field of display such as chrome, gold, aluminum, platinum, copper, magnesium, manganese, calcium and alloys thereof. The metals may exist as oxides or nitrides. The metal oxides include metal monoxide, metal dioxide, metal trioxide, etc., while metal nitrides include metal mononitride, metal dinitride, metal trinitride, etc. The metal oxides include metal oxides that are naturally generated in the atmosphere. The term "metal" used herein may encompass metal oxides or metal nitrides. Especially, the term "metal" should be understood as encompassing even metal oxides that are naturally generated. These metals, metal oxides or metal nitrides can refract, absorb or reflect light. Besides the metals, inorganics such as carbon and silicon and organics such as photosensitive polymers can be used.

A method of depositing the coating material according to one embodiment of the present invention may be any deposition methods. The specific examples include deposition, thermal evaporation, spray coating, spin coating, etc. The term "deposition" or "coating" used herein should be understood as encompassing these examples.

When depositing the coating material according to one embodiment of the present invention, any methods, which can deposit a coating material only on a portion of the structures, may be used. The specific examples include an oblique angle deposition, in which a substrate having structures formed thereon is installed obliquely to the direction that the coating material is deposited, a screen deposition using a mask having a smaller size than the period of the structures, etc. It may be possible to use a method comprising coating the entire structures with a material and then removing only a desired portion therefrom. The removal of a coating material may include dissolution using a solvent or etching, etc.

The specific examples are shown below. However, they should be understood as being described as way of facilitating the understanding and should not be understood in any way to limit the scope of the present invention.

EXAMPLES

Figure 1B:
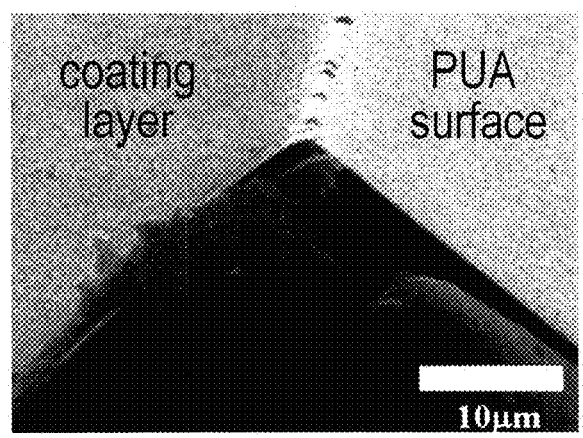

Preparation of an Optical Film Coated with a Coating Material in One Side of a Structure FIG. 1a shows a structure formed on a substrate of an optical film according to one embodiment of the present invention. Each structure is a triangular prism form, and the lower surface of the triangular form is attached to a substrate. Only one of the left and right sides of the upper surface is coated with the coating material. FIG. 1b is a SEM image showing the deposition of metal on only one side of a prism. It can be confirmed that the opposite side of the deposited side is not deposited with metal at all.

Figure 1C:
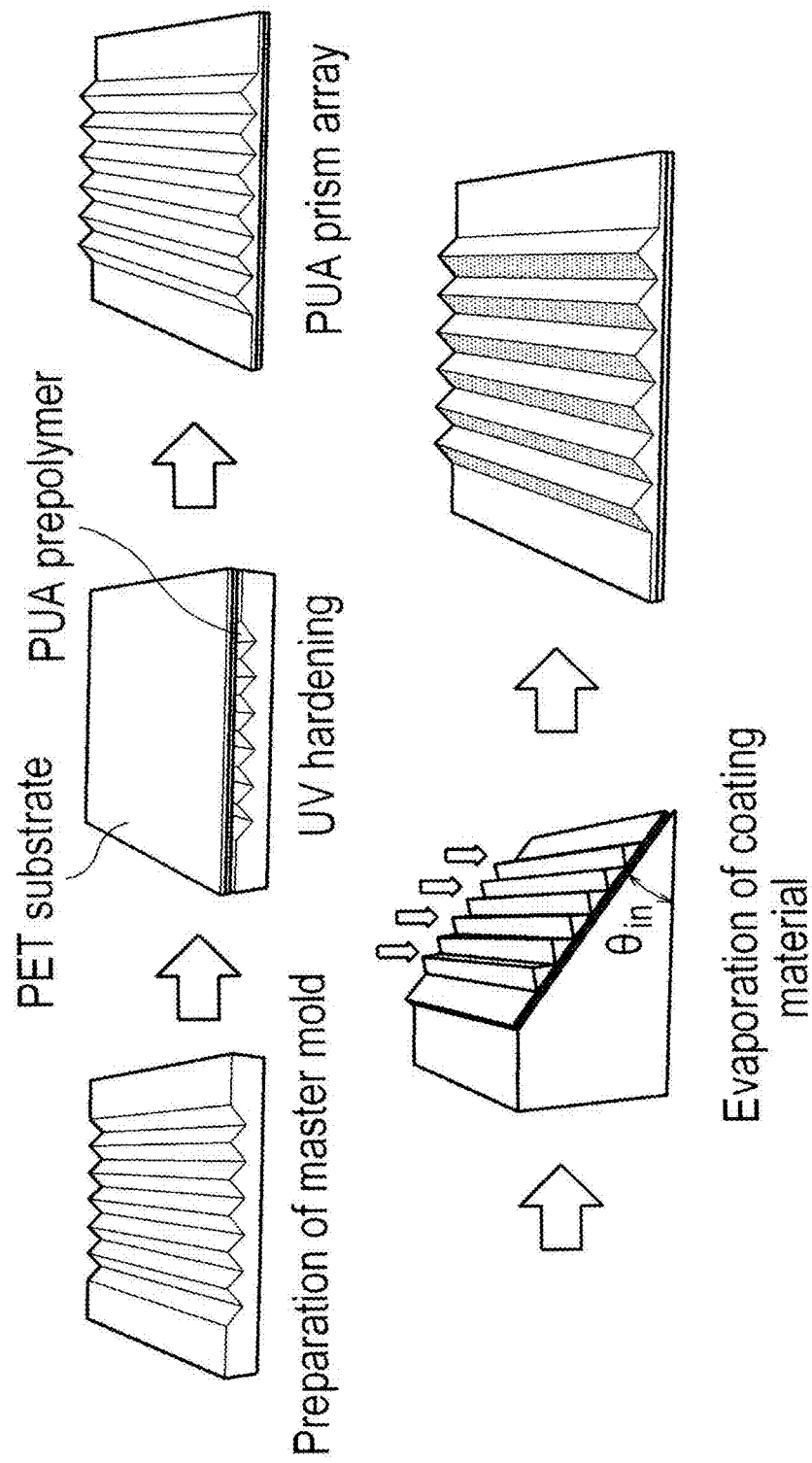

FIG. 1c shows one representative method to make the optical film according to one embodiment of the present invention. First, a master mold formed with a prism pattern is made. On the master mold, a polyurethane acrylate (PUA) prepolymer, which is a liquid polymer that can be hardened by Ultraviolet Ray (UV) on the master mold, is poured, Then, on top of that, a transparent polyethylene terephthalate (PET) film is put as a substrate. At this state, the PUA prepolymer is evenly spread and then hardened by irradiation of UV. After that, by being separated from the master mold, a PUA mold is made in which a prism pattern is formed on the PET film. At this time, the master mold may be any form of a structure that has been previously formed, and can be made by a method such as silicon etching, etc. Besides the polymer, any material can be used as the substrate as long as it is a transparent material such as glass.

By using an inclined loader, aluminum or chrome is obliquely deposited with the thickness of 100 nm to 300 nm so that only one side of the prism pattern is coated. In case that aluminum is deposited on the prism pattern, aluminum reflects light, However, in case that chrome is deposited, it is oxidized and exists as chrome oxide form, which is regarded as absorbing light. If the angle of oblique deposition and the angle of the prism pattern are ideally identical with each other, then it becomes possible to perfectly coat only one side with aluminum. In reality, in the experiment, by using the inclined angle ($\theta_{in}$) of 30 to 60°, it prevented the other side from being deposited with aluminum or chrome. Besides aluminum or chrome, any materials may be used as the deposited materials as long as they have a different refractive index, absorbancy or reflectivity from that of the substrate formed with a structure array.

Figure 2A:
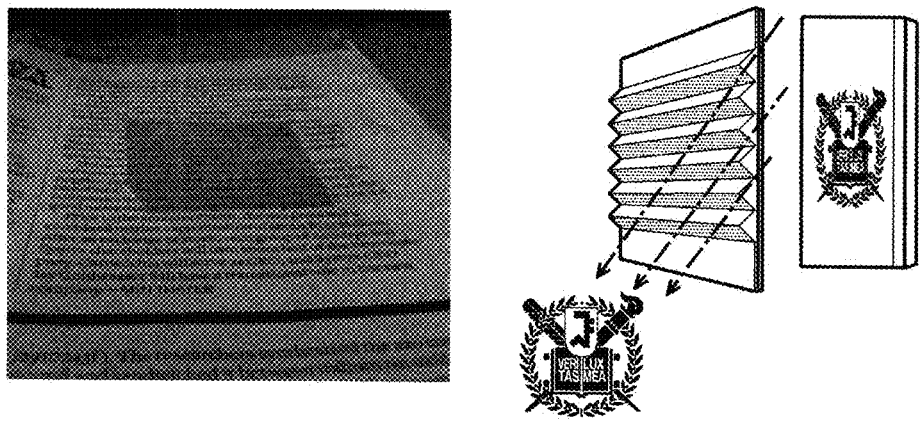
FIG. 2 shows pictures of optical films according to one embodiment of the present invention, wherein a coating material is coated on one of the left and right sides of the upper surface of the structures, taken on a newspaper at an angle of view of at least 45°.
Figure 2B:
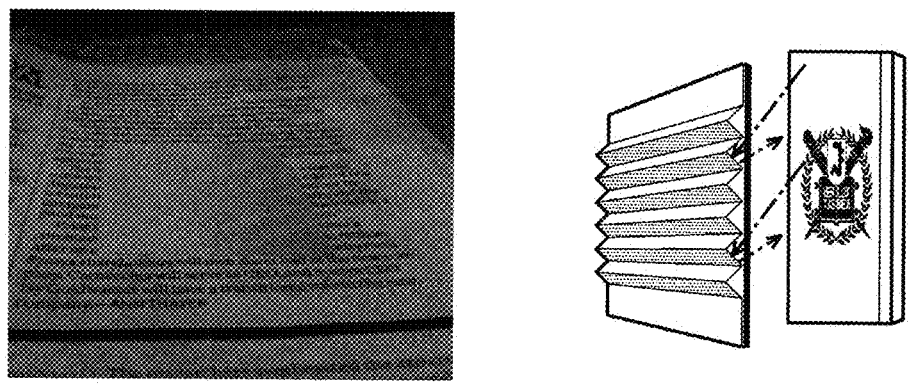

The optical film according to one embodiment of the present invention may be used as a film that is transparent or opaque depending on the direction of view. FIG. 2a is a picture that is viewed with 45 degrees of viewing angle in case that the optical film, in which one side of the structure is coated with the coating material according to one embodiment of the present invention, is put on the paper. In such a case, the letters underneath the paper can be read since the letters may be seen through the substrate on which the transparent structure is formed, as shown in FIG. 2a. FIG. 2b is a picture of the paper, which is taken after rotating the optical film according to one embodiment of the present invention by 180 degree in a direction that is parallel to the paper. In this case, the letters of the paper underneath the optical film according to one embodiment of the present invention cannot be seen since the surface that is deposited with coating materials hinders a viewer's sight. As such, the optical film according to one embodiment of the present invention has a directivity that something underneath can be seen or not, depending on the direction of the viewer.

Examples when Carbon is Deposited as a Coating Material

Using carbon instead of metal as a coating material, an optical film is made in which only one side of the structure is coated with the coating material. Each structure is triangular prism form, and the lower surface of the triangular form is attached to a substrate. Further, only one of the left or right side of the upper surface of the triangular form is coated with the coating material.

Figure 3:
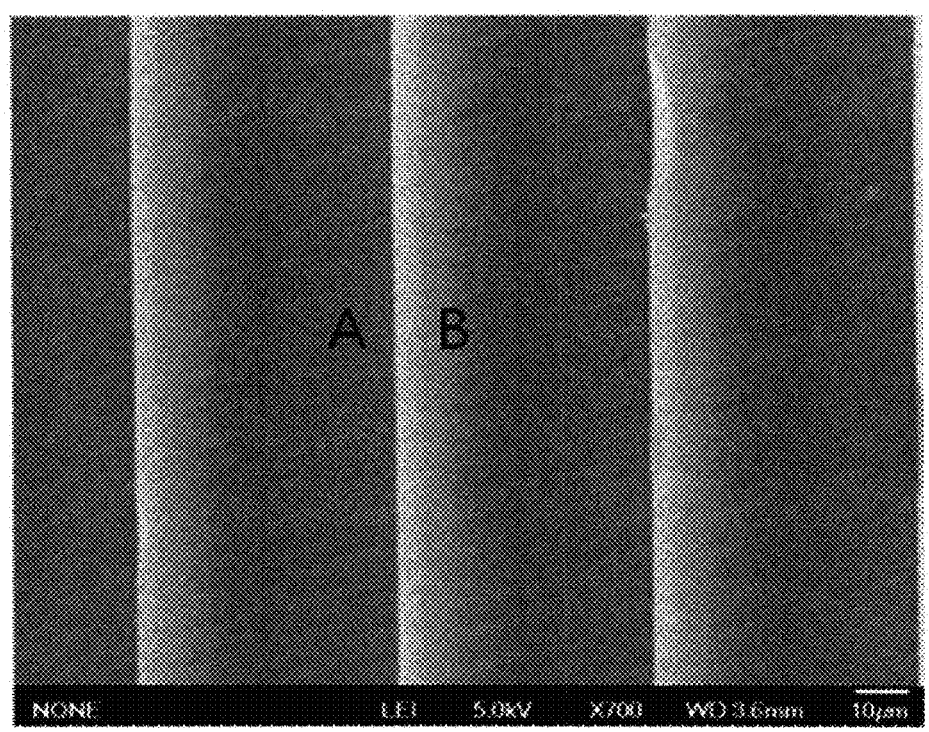
FIG. 3 is a Scanning Electron Microscope (SEM) image of the upper surface of the optical film according to one embodiment of the present invention, wherein carbon is coated on one of the left and right sides of the upper surface of the structures.

FIG. 3 is a SEM image of the surface of the optical film that is deposited with carbon. In this case, the carbon source was heated with E-gun Evaporator (from V-System) under the high-degree vacuum (about $10^{-6}$ Torr) to obliquely deposit amorphous carbon on only one side of the structure formed on the film by about 100 nm with the speed of 20 A/sec. Portion A is the surface not deposited with carbon, while portion B is the surface deposited with carbon.

Figure 4A:
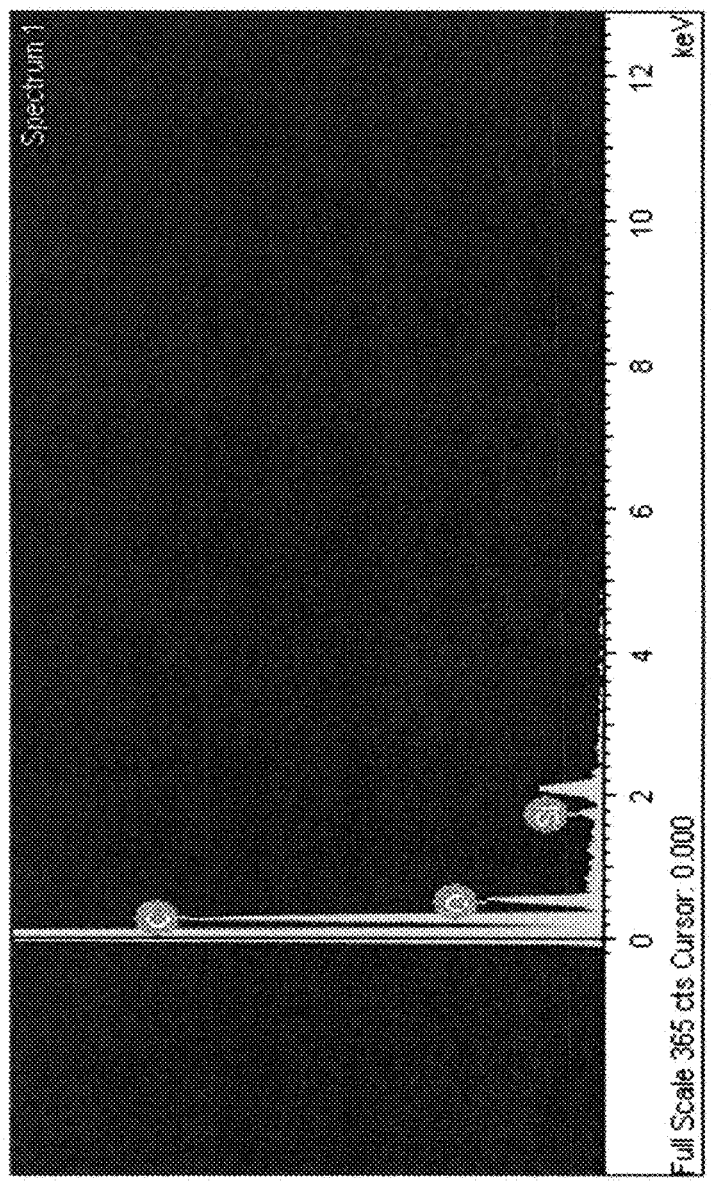
FIG. 4 shows Energy-Dispersive X-ray Spectroscopy (EDXS) graphs showing the composition of the surface of the optical film according to one embodiment of the present invention, wherein carbon is coated on one of the left and right sides of the upper surface of the structures.
Figure 4B:
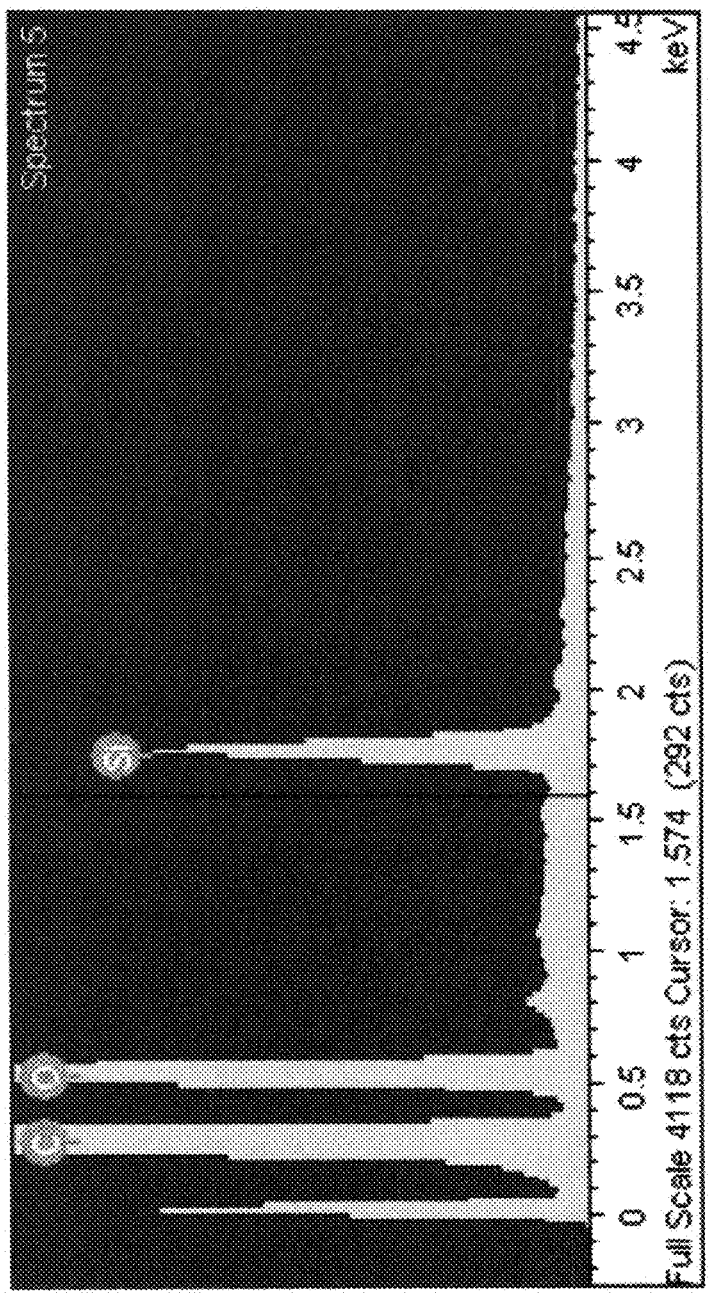

To confirm the deposition of carbon more clearly, an element analysis was conducted. Energy-Dispersive X-ray Spectroscopy (EDXS, Jeol IBM-6701F®) was used, and the results are presented in FIG. 4 and Table 1. Based on FIG. 4 and Table 1, when compared to portion A, portion B shows that an amount of oxygen is decreased and an amount of carbon is increased. That is, as a coating material, it is confirmed that carbon can be used in one embodiment of the present invention.

TABLE 1

| Portion A (surface not deposited with carbon) | | | Portion B (surface deposited with carbon) | | |
|---|---|---|---|---|---|
| Element | Weight % | Ratio of element (%) | Element | Weight % | Ratio of element (%) |
| C | 25.99 | 32.16 | C | 69.05 | 75.29 |
| O | 71.78 | 66.67 | O | 29.19 | 23.89 |
| Si | 2.22 | 1.18 | Si | 1.76 | 0.82 |
| Total | 100.00 | | Total | 100.00 | |

Figure 5A:
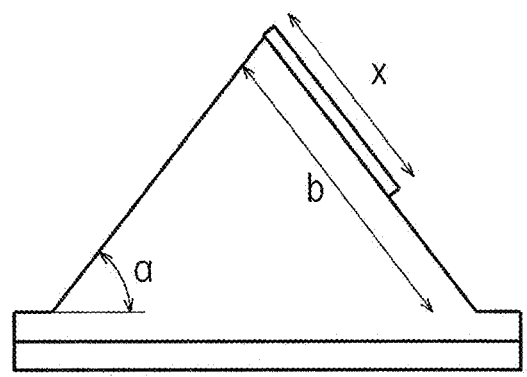
FIG. 5 shows an optical film having a symmetrically different transmittancy depending on the direction according to one embodiment of the present invention, wherein a coating material is partially coated on a portion of one of the left and right sides of the upper surface of the structures.
Figure 5B:
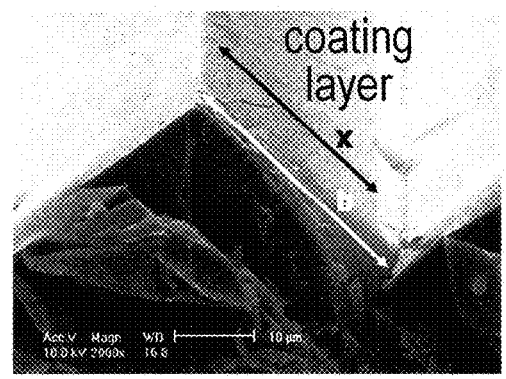

Manufacturing of an Optical Film, in which a Coating Material is Partially Coated on One Side of a Structure The deposition level of a coating material (that is, coverage ratio) may be controlled by regulating an oblique angle of deposition. FIG. 5 shows the optical film according to one embodiment of the present invention, in which the coating material is coated on only a portion of one side of the structure and its transmittancy is symmetrically changed depending on the direction. FIG. 5a shows a schematic diagram of the optical film, and its coverage ratio can be obtained according to Mathematical Formula 1. FIG. 5b is a SEM image showing that when the deposition degree of coating material was 50 degrees, in which the coating material could not completely cover the one side of the structure. Ideally, when supposing that the light is straight, the coverage ratio of the coating material can be obtained according to Mathematical Formula 1 provided below.

$$\frac{x}{b} = 1 - \frac{\sin(\alpha + \theta_{in} - 90)}{\sin(\alpha - \theta_{in} + 90)}$$ [Mathematical Formula 1]

(wherein x represents the length covered with coating material, b represents the length of one side of the structure, x/b represents the coverage ratio of coating material, α represents the degree between the structure and the substrate, and $\theta_{in}$ represents the slanted degree of loader, or the deposition degree of coating material).

Figure 6:
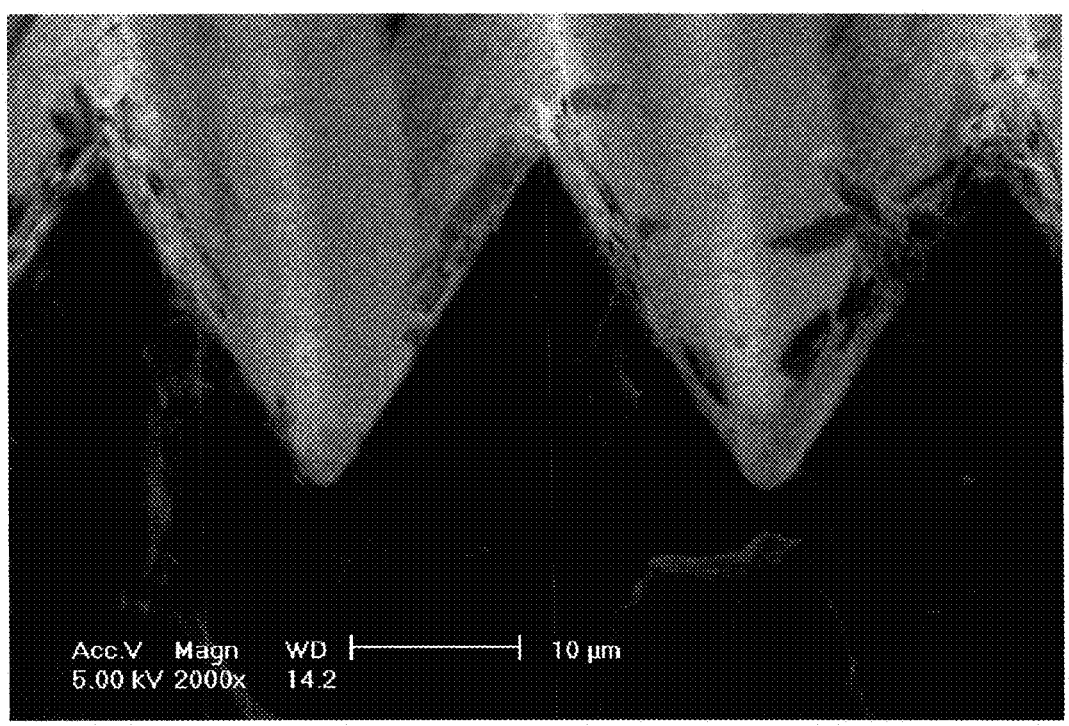
FIG. 6 is a SEM image of a privacy film having a symmetrically different transmittancy depending on the direction according to one embodiment of the present invention, wherein a coating material is partially coated on a portion of each of the left and right sides of the upper surface of the structures.

Manufacturing of an Optical Film, in which a Coating Material is Partially Coated on Both Sides of the Structure When a partial coating is used symmetrically, it becomes possible to make an optical film, which has a characteristic that an image can be seen from front, but cannot be seen well from both sides. That is, as shown by the image provided in the upper right on FIG. 5c, when the coating material is deposited two times by changing the direction, it becomes possible to form a structure, in which the coating material is symmetrically coated only on the top portion of the structure, as shown in the SEM image of FIG. 6. As such, the inventors of the present invention could manufacture a privacy film that has visibility only on the front but not both sides.

Figure 5D:
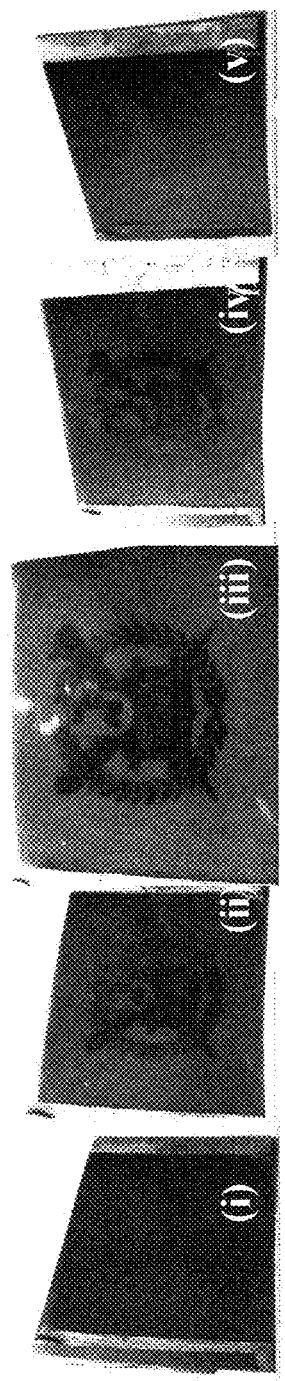
Figure 7A:
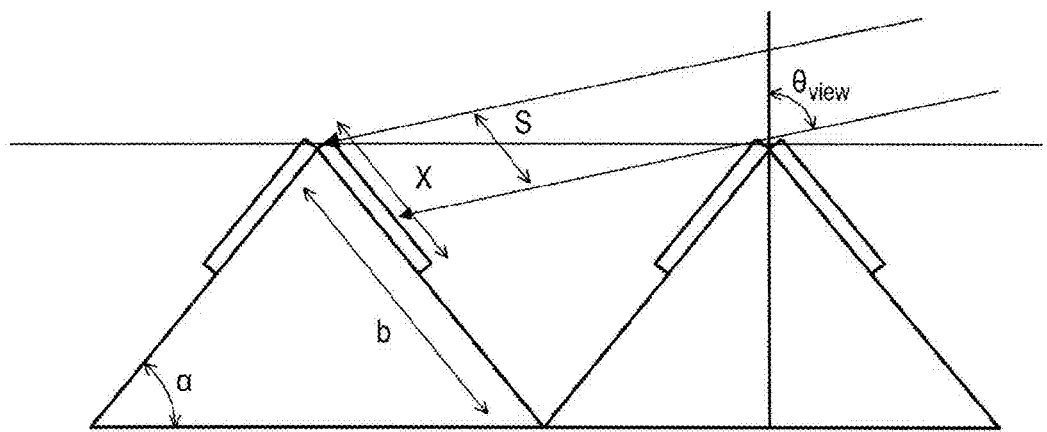
FIG. 7 shows schematic diagrams of a structure array according to one embodiment of the present invention, wherein a coating material is partially coated on a portion of each of the left and right sides of the upper surface of the structures.
Figure 7B:
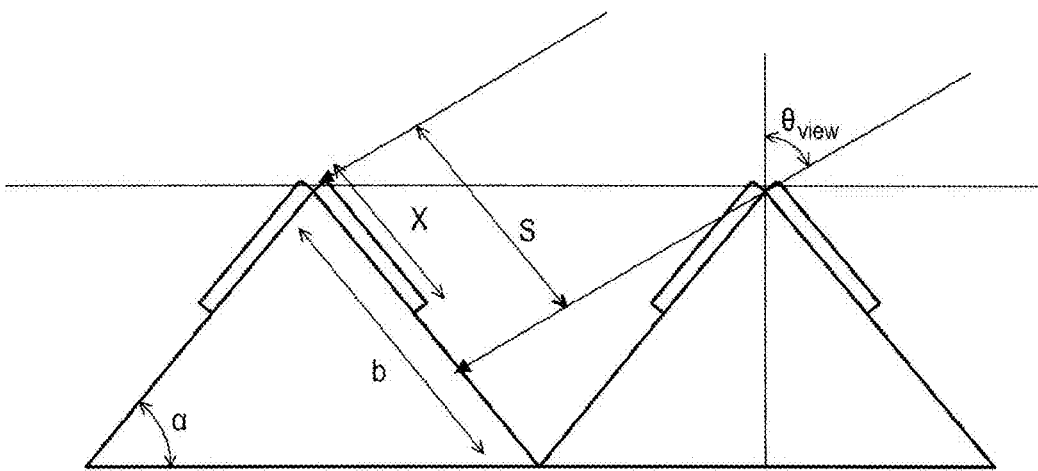
Figure 7C:
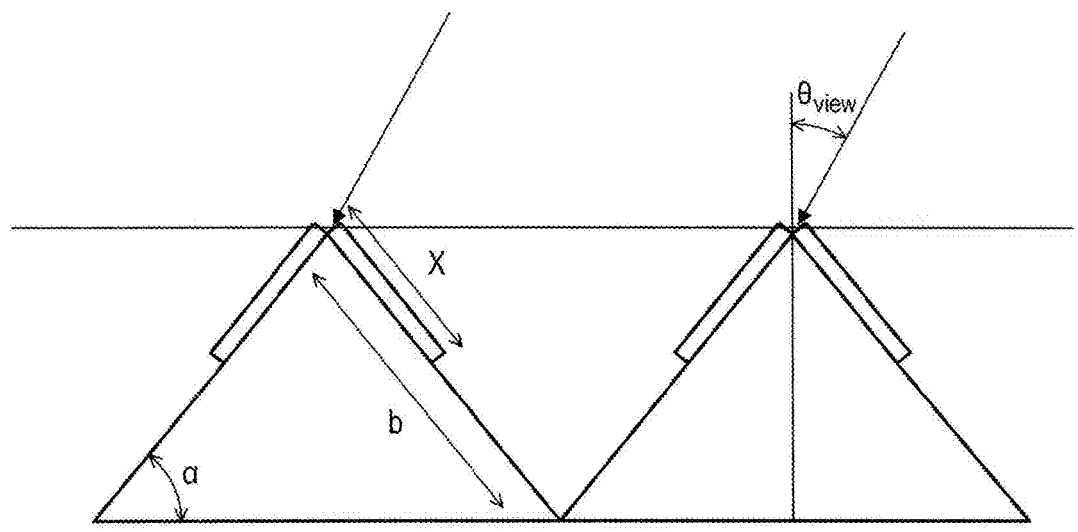

When a viewing angle of 0 degree is defined as the viewing angle of vertical direction from the emission side of the light, if the viewing angle ($\theta_{view}$) is larger than the deposition angle ($\theta_{in}$) of the coating material, all lights are blocked so that things the viewing angle ($\theta_{view}$) is smaller than the deposition angle of the coating material, the transparent portions except for the portions blocked from the coating material are shown and become partially transparent ((ii) and (iv) in FIG. 5d and FIG. 7b). Further, if the viewing angle becomes gradually smaller than the unique angle of the structure, then the portions that are not covered from the coating material are all shown, and thus, the transmission level can be represented as 1-b/x ((iii) in FIG. 5d and FIG. 7c).

[Mathematical Formula 2]

$$|\theta_{view}| > \theta_{in}: \quad T = 0$$

$$90 - \alpha < |\theta_{view}| < \theta_{in} \quad T = 1 - \frac{1 - \sin(\alpha + \theta_m - 90)/\sin(\alpha - \theta_m + 90)}{1 - \sin(\alpha + \theta_{view} - 90)/\sin(\alpha - \theta_{view} + 90)}$$

[Mathematical Formula 3]

$$|\theta_{view}| < 90 - \alpha \quad T = 1 - \frac{x}{\alpha} = \frac{\sin(\alpha + \theta_{in} - 90)}{\sin(\alpha - \theta_{in} + 90)}$$

(wherein $\theta_{view}$ represents the viewing angle, $\theta_{in}$ represents the deposition angle of the coating material, T represents transmittancy, α represents the angle between the structure and the substrate, and x represents the length in which the coating material is covered).

FIG. 5c shows the transmittancy (T) according to the viewing angle ($\theta_{view}$) in terms of the angle of the structure (α) by using Mathematical Formulas 2 and 3. As shown in FIG. 5c, as the angle (α) of the structure increases, the transmittancy of the middle portion is increased with respect to the same oblique deposition angle ($\theta_{in}$). FIG. 5d shows pictures that are changed according to the viewing angle when a paper having a drawing is put under the optical film having the structure array, which is deposited two times with the oblique deposition angle ($\theta_{in}$) of 60° by using a structure with an angle (α) of 60°. In portion (i), the viewing angle is very large and all parts are blocked, and thus, things cannot be seen. In portion (ii), the viewing angle becomes smaller and the transparency becomes increased. In portion (iii), the transparency is Since the direction of the optical film is changed and the coating material is symmetrically deposited, portions (iv) and (v) show the opposite trends when compared to portions (i) and (ii).

Application Examples

Application of the Optical Film According to One Embodiment of the Present Invention to Displays or Directional Light Source Devices, in which the Brightness is Asymmetrically Changed Depending on the Viewing Angle The conventional prism array film gathers the light emitted from a light source device vertically from the emitting side so that it is used as an optical film in LCD displays. On the contrary, if the prism array film is reversed upside down, then the light can be spread left and right. In manufacturing the optical film according to one embodiment of the present invention, if the materials with a high refractive index such as metals are used as a coating material, then light can be asymmetrically spread.

FIG. 8 shows the asymmetric changes of brightness according to the viewing angle when the optical film according to one embodiment of the present invention is reversely used. FIG. 8a is a schematic diagram that the optical film according to one embodiment of the present invention is reversed upside down, in which the surface coated with coating material is faced toward the light source device. FIG. 8b shows the dispersion of the light according to the viewing angle, which is the simulation result using Light Tools, in which the conventional symmetric optical film is reversed upside down and then put on the light source device. FIG. 8b confirms that the dispersion of the light is symmetrical with regard to the left and right direction. FIG. 8c shows the simulation result using Light Tools, in which the optical film according to one embodiment of the present invention is reversed upside down and then put on the light source device. FIG. 8c confirms that the dispersion of the light is asymmetrical and the portion covered with metal is darker, while the opposite portion is brighter.

Figure 8A:
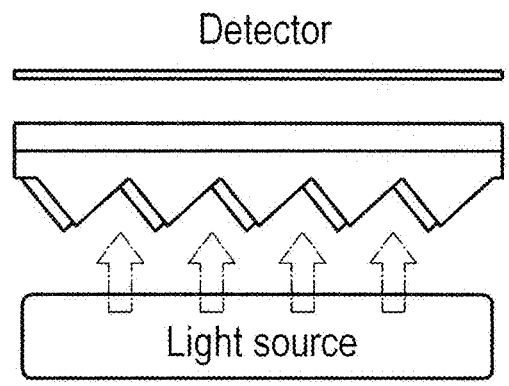
FIG. 8 shows schematic diagrams, simulation results and pictures of displays or directional light source devices having a asymmetrically different brightness depending on the angle of view in which the optical film according to one embodiment of the present invention is applied.
Figure 8B:
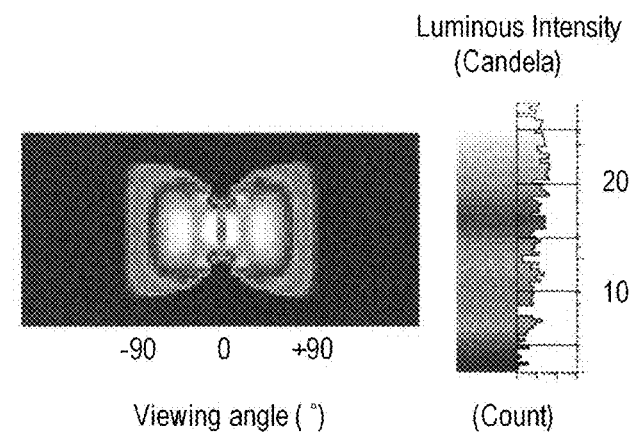
Figure 8C:
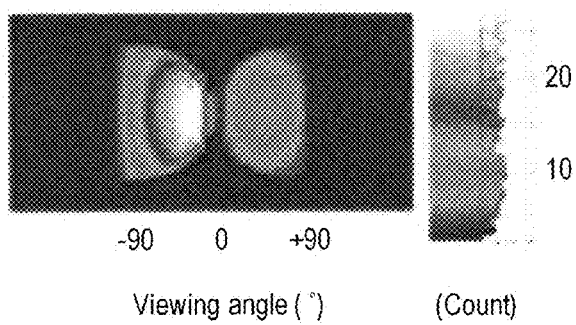
Figure 8D:
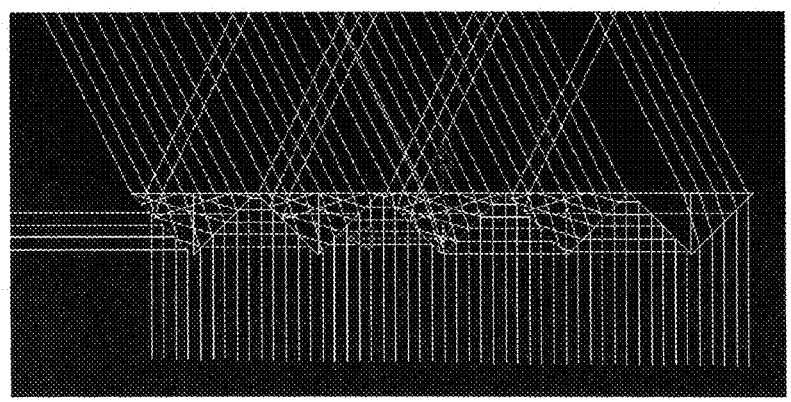
Figure 8E:
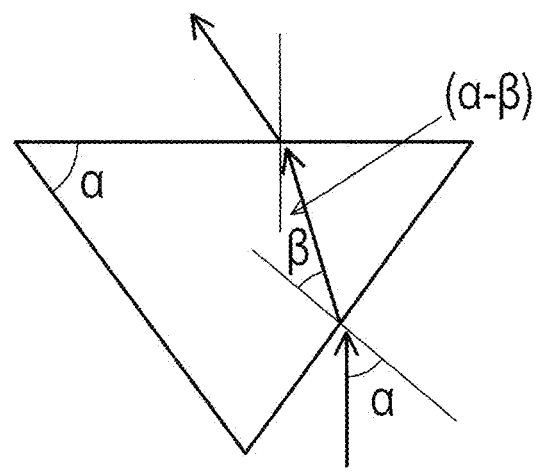

FIG. 8d is the result of a ray tracing using Light Tools, which can be simply interpreted by the Snell's law, which is well known to a person skilled in the art. FIG. 8e is a drawing that can be calculated by the Snell's law such as Mathematical Formulae 4 and 5.

$$\sin \beta / \sin \alpha = n_{air}/n_{polymer}, \quad \text{[Mathematical Formula 4]}$$

$$\sin \gamma / \sin(\alpha - \beta) = n_{polymer}/n_{air} \quad \text{[Mathematical Formula 5]}$$

(wherein α represents the angle between the structure and the substrate, β represents the angle of the incident light from the vertical direction of a plane of incident when the light incident to the structure passes through the prism array, and $n_{polymer}$ and $n_{air}$ are refractive indicia of the structure and air, respectively).

Figure 8F:
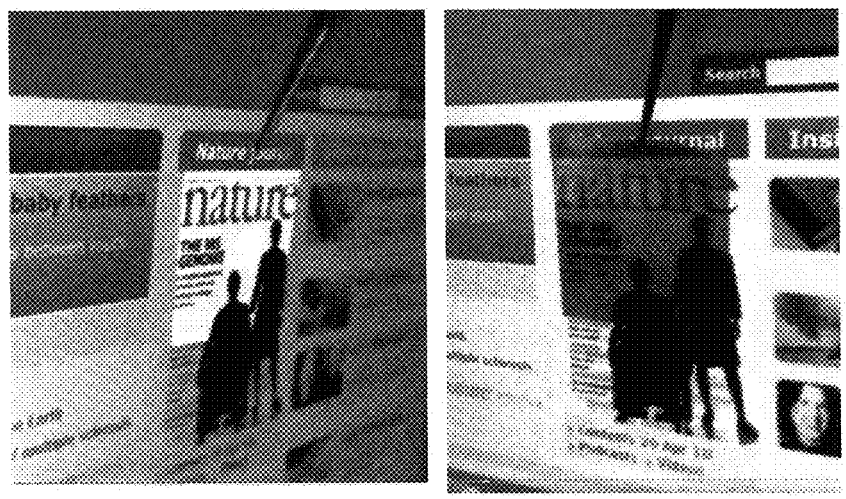

FIG. 8f shows pictures of a LCD monitor depending on the angle of view, in which the optical film according to one embodiment of the present invention is reversed upside down and then put on the LCD monitor. As shown in the pictures, a case of seeing from one direction has better brightness than a case of seeing from a different direction. The interesting thing is that the portions covered with the optical film according to one embodiment of the present invention have better brightness or darkness compared to the surrounding portions, which is considered that the light is re-reflected by the metal coating material deposited on the optical film, and thus, the bright portion is seen brighter.

If the reflected light is not absorbed, then the lights blocked in one direction are expected to be re-reflected and then concentrated to another direction. Thus, the optical film according to one embodiment of the present invention may be applied to the displays such as LCDs, as well as directional light source devices that are used in gathering light in one direction.

Application of the Optical Film According to One Embodiment of the Present Invention to the Formation of Asymmetrical Pattern With using the optical film according to one embodiment of the present invention, the property of asymmetrical dispersion of light is applied to photolithography to regulate the light exposure according to the direction, which can produce asymmetrical pattern. Such an asymmetrical pattern has properties of i) a directional dry adhesive such as a bump of a lizard's sole, and ii) flowing liquid in a specific direction, which can be applied in various fields.

Figure 9A:
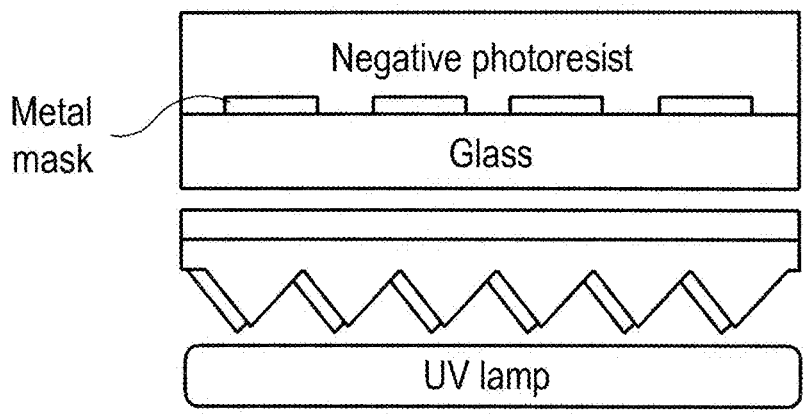
FIG. 9 shows schematic diagrams and SEM images of asymmetric photoresist patterns formed by applying the optical film according to one embodiment of the present invention to the light source device used in the photolithography process.
Figure 9B:
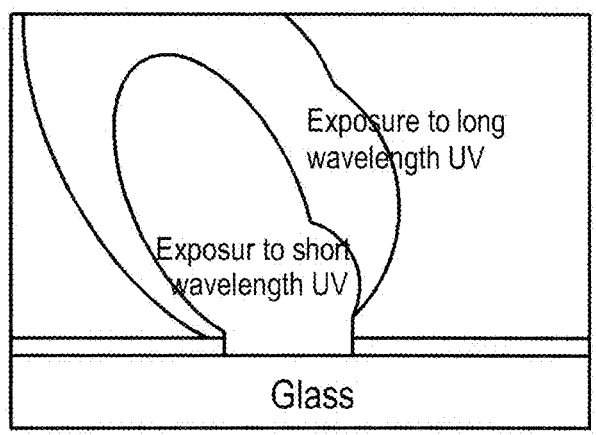

FIG. 9a is a representative schematic diagram of the process of such asymmetrical photolithography. On a glass substrate that is patterned with a metal layer, a negative photoresist (DNR-H200PL, Dong-Jin Semichem. Co., Ltd.) is coated with a thickness of 10 μM. After that, the optical film according to one embodiment of the present invention is attached to the opposite side of the photoresist-coated side and then exposed to the light. When the amount of exposure of the light is appropriately controlled, the exposure of the light may be varied depending on the direction, as shown in FIG. 9b, and thus, the asymmetric pattern can be achieved. Further, as the exposure of the light is increased, the shape is changed accordingly.

Figure 9C:
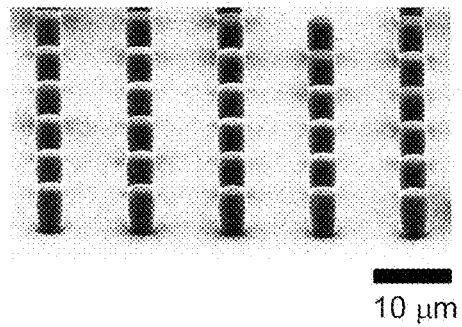
Figure 9D:
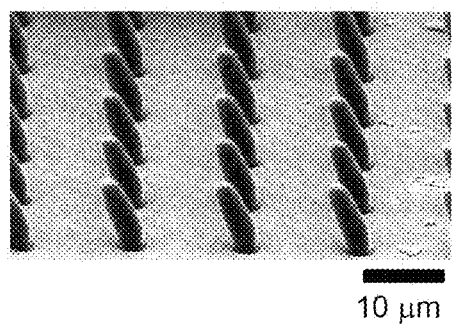
Figure 9E:
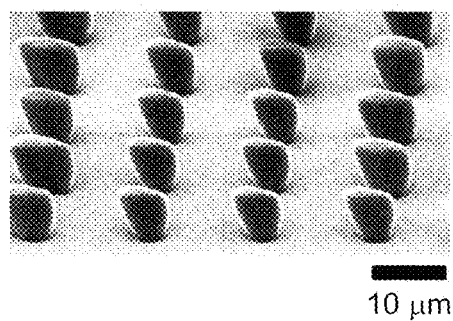
Figure 9F:
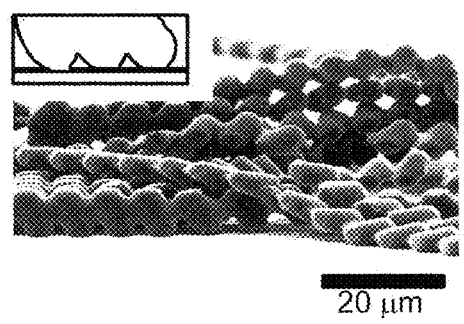

FIG. 9c is a SEM image of the pattern formed by the conventional photolithography without using the optical film according to one embodiment of the present invention. As shown in the picture, a pattern of symmetric cylinder was formed. FIG. 9d is a SEM image of patterns formed by attaching the optical film according to one embodiment of the present invention and performing the photolithography for 30 seconds of the exposure time. Here, patterns of cylinder were bent in one direction. FIG. 9e is a SEM image of patterns formed by attaching the optical film according to one embodiment of the present invention and performing the photolithography for 90 seconds of the exposure time. Here, the patterns of asymmetric trapezium were obtained. Further, when the distances between the patterns are narrow, bullet-shaped patterns can be implemented as shown in FIG. 9f. Based on such results, if the amount of exposure of the light and the distances between patterns are appropriately controlled, then it becomes possible to form a desired structure with an asymmetric pattern by simply positioning the optical film according to one embodiment of the present invention in front of the light source devices used in photolithography process.

Application of the Optical Film According to One Embodiment of the Present Invention to the Glass-Free Three-Dimensional Displays or Holograms To apply the optical film according to one embodiment of the present invention to the glass-free three-dimensional displays or holograms, the film is modified as below.

Figure 10:
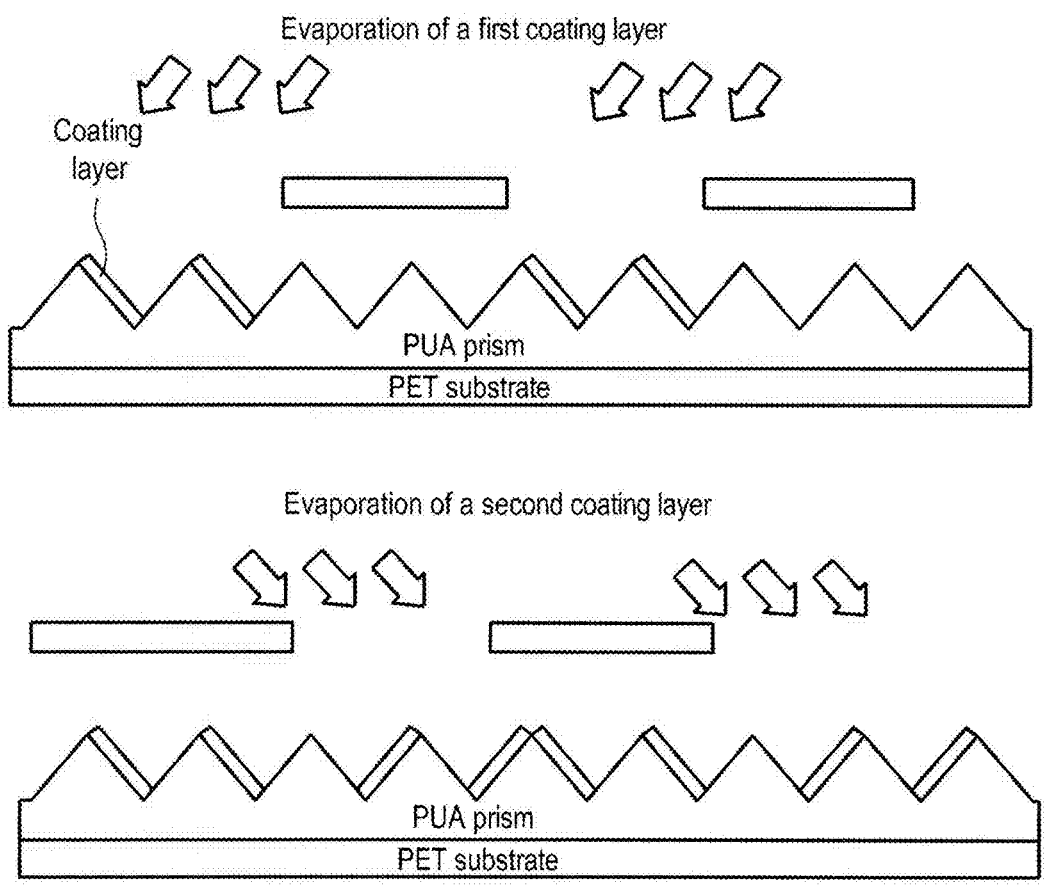
FIG. 10 shows schematic diagrams showing one example of deposition methods in preparation of the optical film according to one embodiment of the present invention, wherein the direction of coating of a coating material is periodically or non-periodically changed.

As shown in FIG. 10, a coating material is partially deposited on one side of a portion of a structure array by using a mask. After that, the mask was moved and then a coating material is deposited on the opposite side of the remaining portion of a structure array, which is not deposited with the coating material. That is, the direction of the coating layer is periodically changed.

Figure 11A:
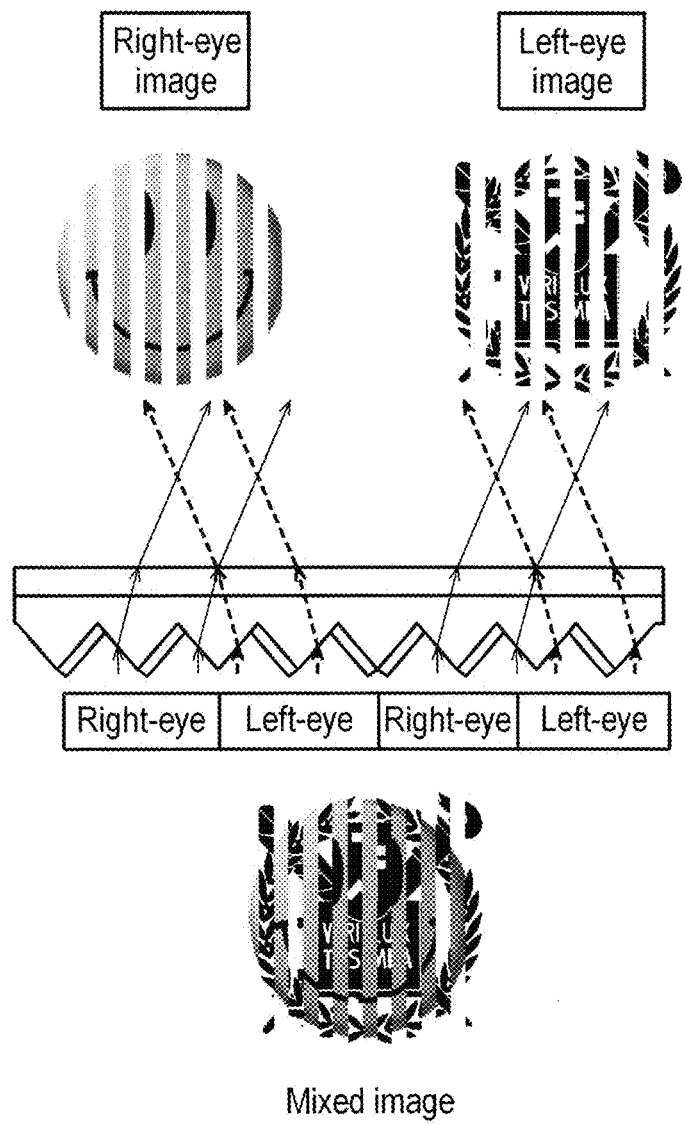
FIG. 11 shows schematic diagrams and pictures of cases where the optical film according to one embodiment of the present invention is applied to the glass-free three-dimensional display.
Figure 11B:
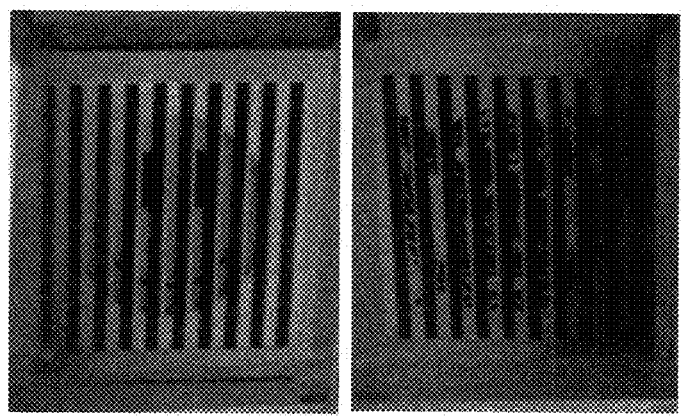
Figure 11C:
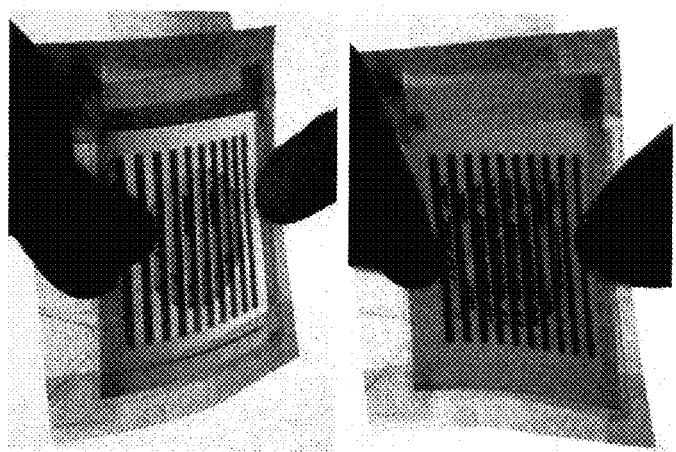

When the optical film manufactured according to FIG. 10 is put on an image or a screen having the same period, the different images are shown depending on the angle of view, as shown in FIG. 11a. FIG. 11b shows pictures of a paper, which is printed with two different images having a period, taken from the left and right direction, while the optical film according to one embodiment of the present invention is put on the pictures. Further, as shown in FIG. 11c, if the optical film formed on a flexible substrate is put on a paper printed with two different images and then bent together, then different images are shown depending on the bending direction. By using such a principle, each eye can see the different images to each other, which can be applied to glass-free three-dimensional displays. Also, if a user's view is moved or bent to left or right, then only one certain image can be seen, Thus, the optical film according to one embodiment of the present invention can be applied to the two dimensional displays, in which only one image is seen. Although a lattice is shown to the user in FIG. 11, if the distances of masks are minimized to the degree that is not seen by a human's eyes, then such problems can be easily resolved.

Figure 12:
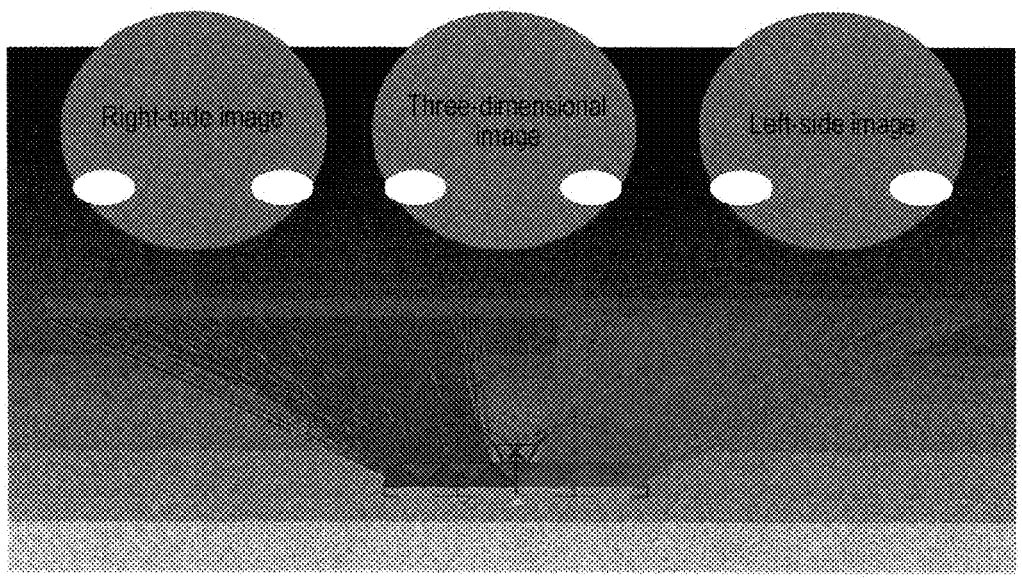
FIG. 12 is a schematic diagram showing the principle of forming three-dimensional images in case where the optical film according to one embodiment of the present invention is applied to the glass-free three-dimensional display.

FIG. 12 shows a schematic diagram of forming principle of a three-dimensional image in case when the three-dimensional display is manufactured by applying the optical film according to one embodiment of the present invention. Since the light transmitted through the optical film according to one embodiment of the present invention is refracted to the different directions, the images that are seen on the right and left sides become different each other. Thus, when the image is seen at the front, different images are seen on the left and right eyes, and thus, a three-dimensional image can be formed. If the image is seen on the left or right side, then a two-dimensional image can be seen.

Moreover, if optical devices (e.g., lens, mirror, prism, etc.) can be appropriately designed according to one embodiment of the present invention, then the viewing angle that is seen as three-dimensional may be widen. Further, the period and position of the structure array of the optical film according to one embodiment of the present invention may be changed to enhance the performance.

INDUSTRIAL AVAILABILITY

The optical film according to one embodiment of the present invention can be applied to image devices, which need to change images or brightness depending on the direction, or produce the three-dimensional images. The specific applicable fields include, e.g., displays that changes brightness or images depending on the angle of view, directional light source devices, glass-free three-dimensional displays, holograms, etc.

What is claimed is:

1. An optical film for use on a display device or a light source for photolithography, comprising a substrate on which an array of structures is formed, wherein a material having a different refractive index, absorbency or reflectivity from that of a surface of the structures is partially coated on the surface of the structures, and a period, selected from a distance from a trough to a next trough and a distance from a crest to a next crest, of the array of structures provides a change in brightness, image, or light strength according to the viewing angle or the direction in which light passes through, or for representing a three-dimensional image.

2. The optical film according to claim 1, wherein each of the structures is in a triangular prism form, the bottom of the triangular form is attached to the substrate, and the material is partially coated on the left and right sides, or the left or right sides of an upper surface of the triangular form.

3. The optical film according to claim 2, wherein the material is coated on either one of the left or right sides.

4. The optical film according to claim 2, wherein the material is coated on a portion of either one of the left or right sides.

5. The optical film according to claim 2, wherein the material is coated on a portion of each of the left and right sides.

6. The optical film according to claim 1, wherein the material is a metal.

7. The optical film according to claim 2, wherein the material is coated on either one of the left or right sides, and the case in which the material is coated on the left sides and the case in which the material is coated on the right sides are periodically changed.

8. A method of manufacturing an optical film for use on a display device or a light source for photolithography, characterized in that the method comprises the steps of:
  a) forming an array of structures on a substrate;
  b) partially coating a surface of the structures with a material having a different refractive index, absorbancy or reflectivity from that of the surface of the structures, wherein a period, selected from a distance from a trough to a next trough and a distance from a crest to a next crest, of the array of structures is selected to provide a change in brightness, image, or light strength according to the viewing angle or the direction in which light passes through, or for representing a three-dimensional image.

9. The method according to claim 8, wherein the coating step comprises the step of using a mask blocking the coating of the material.

10. A display device equipped with an optical film according to claim 1.

11. The device according to claim 10, wherein the display device is a three-dimensional display device.

12. A directional light source device equipped with an optical film according to claim 1.

13. A hologram equipped with an optical film according to claim 1.

* * * * *